(12) United States Patent
Hara et al.

(10) Patent No.: US 11,101,512 B2
(45) Date of Patent: *Aug. 24, 2021

(54) BATTERY PACK

(71) Applicant: Sony Corporation, Tokyo (JP)

(72) Inventors: Mieko Hara, Tokyo (JP); Jiro Moriya, Chiba (JP); Tomomaru Ueda, Kanagawa (JP); Michihito Kobayashi, Kanagawa (JP); Toshiyuki Okada, Aichi (JP); Hideki Kamiya, Aichi (JP)

(73) Assignee: Sony Corporation, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 16/239,355

(22) Filed: Jan. 3, 2019

(65) Prior Publication Data

US 2019/0140219 A1    May 9, 2019

Related U.S. Application Data

(63) Continuation of application No. 15/628,385, filed on Jun. 20, 2017, now Pat. No. 10,217,972, which is a (Continued)

(30) Foreign Application Priority Data

Mar. 29, 2010 (JP) .............................. JP2010-002063

(51) Int. Cl.
*H01M 2/10* (2006.01)
*H01M 50/10* (2021.01)
(Continued)

(52) U.S. Cl.
CPC ....... *H01M 50/10* (2021.01); *H01M 10/0525* (2013.01); *H01M 50/103* (2021.01);
(Continued)

(58) Field of Classification Search
CPC ...... H01M 2/02; H01M 10/0525; H01M 2/06; H01M 2/10; H01M 2/30; H01M 2/1022;
(Continued)

(56) References Cited

U.S. PATENT DOCUMENTS 5,302,887 A     4/1994  Ishiguro et al.
5,415,947 A  *  5/1995  Mitsui ................. H01M 50/597
                                                        429/1
(Continued)

FOREIGN PATENT DOCUMENTS

CA        2 508 054 A1     12/2005
CN          1291355 A        4/2001
(Continued)

OTHER PUBLICATIONS

International Search Report from International Application No. PCT/JP2011/053736 dated May 24, 2011.
(Continued)

*Primary Examiner* — Alexander Usyatinsky
(74) *Attorney, Agent, or Firm* — Wolf, Greenfield & Sacks, P.C.

(57) ABSTRACT

Provided are a pack main body of a substantially rectangular parallelepiped shape in which a battery cell is embedded, and a terminal portion provided on a front face of the pack main body. The pack main body includes bevelled portions at corner portions formed by a top face and a bottom face and opposite side faces. The terminal portion is provided, in a protruding manner, on the front face at a position biased with respect to centre lines in a width direction and a height direction. The corner portions on one side have a chamfered shape and the corner portions on the other side have a rounded shape.

28 Claims, 10 Drawing Sheets

Related U.S. Application Data continuation of application No. 14/333,360, filed on Jul. 16, 2014, now Pat. No. 9,716,254, which is a continuation of application No. 13/321,089, filed as application No. PCT/JP2011/053736 on Feb. 21, 2011, now Pat. No. 8,828,601.

(51) Int. Cl.

| | | |
|---|---|---|
| *H01M 10/0525* | (2010.01) | |
| *H01M 50/15* | (2021.01) | |
| *H01M 50/20* | (2021.01) | |
| *H01M 50/103* | (2021.01) | |
| *H01M 50/147* | (2021.01) | |
| *H01M 50/172* | (2021.01) | |
| *H01M 50/209* | (2021.01) | |
| *H01M 50/256* | (2021.01) | |
| *H01M 50/543* | (2021.01) | |
| *H01M 50/572* | (2021.01) | |

(52) U.S. Cl.
CPC ......... *H01M 50/147* (2021.01); *H01M 50/15* (2021.01); *H01M 50/172* (2021.01); *H01M 50/20* (2021.01); *H01M 50/209* (2021.01); *H01M 50/256* (2021.01); *H01M 50/543* (2021.01); *H01M 50/572* (2021.01); *H01M 2220/30* (2013.01); *Y02E 60/10* (2013.01)

(58) Field of Classification Search
CPC .... H01M 2/34; H01M 2/0404; H01M 2/0473; H01M 2/0217; H01M 2/1061; H01M 2/0202; H01M 2/1011; H01M 2/1066; H01M 2220/30; H01M 2002/0205; H01M 50/10; H01M 50/209; H01M 50/543; H01M 50/572; H01M 50/256; H01M 50/103; H01M 50/172; H01M 50/20; H01M 50/15; H01M 50/14; Y02E 60/122
See application file for complete search history.

(56) References Cited

U.S. PATENT DOCUMENTS

| | | | |
|---|---|---|---|
| 5,563,005 A | 10/1996 | Ohtani et al. | |
| 5,602,454 A | 2/1997 | Arakawa et al. | |
| 6,051,334 A | 4/2000 | Tsurumaru et al. | |
| 6,057,608 A | 5/2000 | Bailey, Jr. et al. | |
| 6,127,063 A | 10/2000 | Kowalsky et al. | |
| 6,154,004 A | 11/2000 | Higuchi | |
| 6,171,126 B1 | 1/2001 | Wu et al. | |
| D437,579 S * | 2/2001 | Toops | D13/103 |
| 6,228,526 B1 * | 5/2001 | Ozer | H01R 13/11 429/96 |
| 6,261,715 B1 | 7/2001 | Nakamura et al. | |
| D447,122 S | 8/2001 | Harasawa et al. | |
| 6,521,370 B1 | 2/2003 | Takeshita et al. | |
| D473,192 S | 4/2003 | Ouchi et al. | |
| 6,568,962 B2 | 5/2003 | Nakamura et al. | |
| 6,583,600 B2 * | 6/2003 | Haga | H02J 7/0045 320/110 |
| 6,677,078 B2 | 1/2004 | Reise et al. | |
| 6,729,413 B2 | 5/2004 | Turner et al. | |
| D535,253 S | 1/2007 | Buck | |
| 7,223,494 B2 | 5/2007 | Takeshita et al. | |
| 7,781,096 B2 | 8/2010 | Takahashi et al. | |
| 7,989,101 B2 | 8/2011 | Hara et al. | |
| 8,241,774 B2 | 8/2012 | Hara et al. | |
| 8,828,601 B2 | 9/2014 | Hara et al. | |
| 9,023,514 B2 | 5/2015 | Tatehata et al. | |
| 9,508,977 B2 | 11/2016 | Tatehata et al. | |
| 9,716,254 B2 * | 7/2017 | Hara | H01M 50/256 |
| 2003/0003357 A1 | 1/2003 | Tamai et al. | |
| 2004/0058231 A1 * | 3/2004 | Takeshita | H01M 50/597 429/123 |
| 2004/0224228 A1 * | 11/2004 | Gilicinski | H01M 4/50 429/217 |
| 2006/0068280 A1 | 3/2006 | Takeshita et al. | |
| 2006/0251964 A1 * | 11/2006 | Zedell | H01M 50/20 429/176 |
| 2008/0220324 A1 | 9/2008 | Phillips et al. | |
| 2011/0223473 A1 * | 9/2011 | Hara | H01M 50/10 429/179 |
| 2012/0148912 A1 | 6/2012 | Hara et al. | |
| 2012/0237801 A1 | 9/2012 | Tatehata et al. | |
| 2014/0329123 A1 | 11/2014 | Hara et al. | |
| 2015/0263327 A1 | 9/2015 | Tatehata et al. | |
| 2017/0040574 A1 | 2/2017 | Tatehata et al. | |
| 2017/0288178 A1 | 10/2017 | Hara et al. | |

FOREIGN PATENT DOCUMENTS

| | | |
|---|---|---|
| CN | 1670984 A | 9/2005 |
| CN | 101232084 A | 7/2008 |
| CN | 102439758 A | 5/2012 |
| EP | 1 411 564 A1 | 4/2004 |
| EP | 1 603 246 A1 | 12/2005 |
| EP | 1603246 * | 12/2005 |
| EP | 1 806 796 A1 | 7/2007 |
| EP | 2 426 757 A1 | 3/2012 |
| JP | 2000-058015 A | 2/2000 |
| JP | 2003-036828 A | 2/2003 |
| JP | 2004-327447 A | 11/2004 |
| JP | 3643792 B2 | 4/2005 |
| JP | 2005-190956 A | 7/2005 |
| JP | 2006-202652 A | 8/2006 |
| JP | 2009-170236 A | 7/2009 |
| JP | 2009-205844 A | 9/2009 |

OTHER PUBLICATIONS

Communication pursuant to Article 94(3) EPC dated Jul. 18, 2014 in connection with European Application No. 13 180 697.8.

European Communication Pursuant to Article 94(3) EPC dated Oct. 9, 2018 in connection with European Application No. 13 198 818.0.

\* cited by examiner

FIG. 8
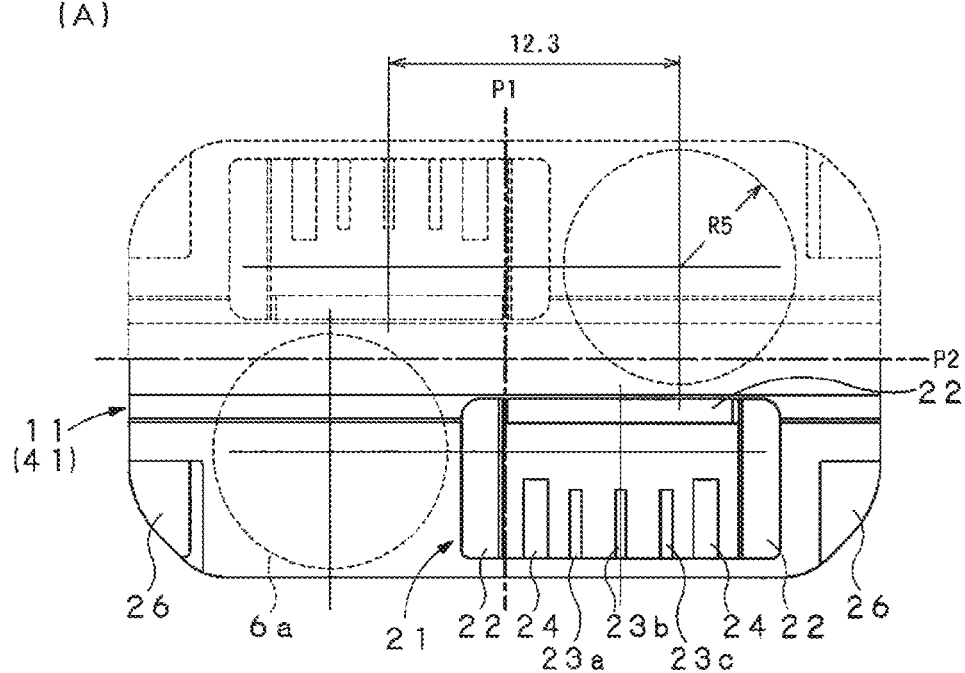
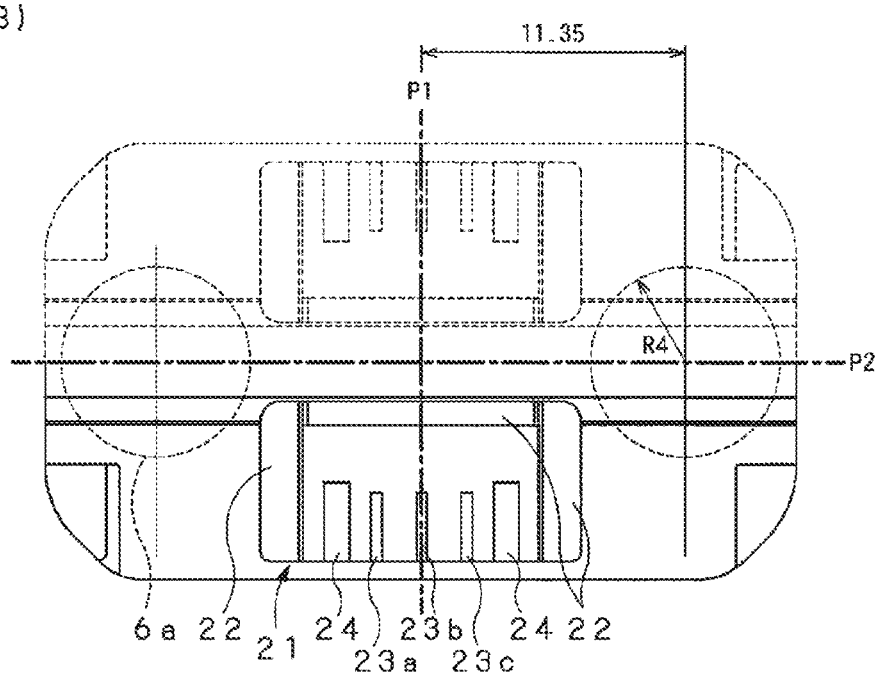

BATTERY PACK

CROSS REFERENCE TO RELATED APPLICATIONS

This application is a continuation of and claims the benefit under 35 U.S.C. § 120 of U.S. patent application Ser. No. 15/628,385, filed Jun. 20, 2017, 7, now U.S. Pat. No. 10,217,972, which is a continuation of and claims the benefit under 35 U.S.C. § 120 of U.S. patent application Ser. No. 14/333,360, filed Jul. 16, 2014, now U.S. Pat. No. 9,716,254, which is a continuation of and claims the benefit under 35 U.S.C. § 120 of U.S. patent application Ser. No. 13/321,089, filed Nov. 17, 2011, now U.S. Pat. No. 8,828,601 which claims the priority benefit as a U.S. National Phase filing under 35 U.S.C. § 371 of international Application No. PCT/JP2011/053736, filed Feb. 21, 2011, which claims the priority benefit of Japanese Patent Application No. 2010-002063, filed in the Japanese Patent Office on Mar. 29, 2010. All of the above-referenced applications are incorporated by reference herein in their entirety.

TECHNICAL FIELD

The present invention relates to a power supply such as a battery pack or a DC plate that is housed in a battery housing of a small electronic appliance such as a digital still camera, a digital video camera, or the like, and that supplies power to this electronic appliance.

BACKGROUND ART

Battery packs such as lithium-ion secondary batteries are installed in small electronic appliances such as digital still cameras, digital video cameras, mobile phones, or the like, in an attachable/detachable manner.

These battery packs generally have every corner portion in a rounded shape, and, even when a user inserts them in battery housings of electronic appliances mistaking the insertion direction, they will usually not break the inner walls or the like of the battery housings.

Furthermore, among the battery packs, there are some that are made into a horizontally or vertically asymmetric shape by being provided with protrusions such as ribs on the surface so that a user will not insert them in battery housings mistaking the insertion direction of the battery packs. However, battery packs provided with protrusions such as ribs are provided with rough surfaces, which will prevent further miniaturization of the battery packs.

CITATION LIST

Patent Literature

Patent Literature 1: JP 2003-36828A

SUMMARY OF INVENTION

Technical Problem

In view of the issue described above, the present invention has its object to provide a power supply capable of preventing breakage of a battery housing even at the time of wrong insertion while realizing overall miniaturization.

Solution to Problem

To solve the issue described above, a power supply according to the present invention includes a pack main body of a substantially rectangular parallelepiped shape in which a battery cell is embedded, and a terminal portion provided on a front face of the pack main body. The pack main body includes bevelled portions at corner portions formed by a top face and a bottom face and opposite side faces, thereby aiming at miniaturization. Also, the terminal portion is provided, in a protruding manner, on the front face of the pack main body at a position biased with respect to centre lines in a width direction and a height direction, and collision between a connection terminal of a battery housing and the terminal portion is prevented even at the time of wrong insertion, and, also, the pack main body is miniaturized to the extent of the protrusion.

The bevelled portions at the corner portions formed by the opposite side faces and the bottom face of the pack main body and the bevelled portions at the corner portions formed by the opposite side faces and the top face of the pack main body are all based on a chamfered shape or a rounded shape. The shapes of the bevelled portions are made the same, thereby preventing breaking of the inner wall or the like of the battery housing even at the time of wrong insertion into the battery housing.

In the case the bevelled portions at the corner portions formed by the opposite side faces and the bottom face of the pack main body and the bevelled portions of the corner portions formed by the opposite side faces and the top face of the pack main body are based on the chamfered shape, the chamfered shape of the bevelled portions of the corner portions formed by the opposite side faces and the top face of the pack main body have a rounded shape that internally contacts a chamfered shape that is the same as the chamfered shape of the bevelled portions of the corner portions formed by the opposite side faces and the bottom face of the pack main body. The pack main body has the shapes of the bevelled portions at the corners formed by the opposite side faces and the top face of the pack main body and at the bevelled portions of the corner portions formed by the opposite side faces and the bottom face of the pack main body made different, thereby preventing wrong insertion.

Furthermore, a bevelled portion may be formed at both of a corner portion formed by the front face, the top face and the bottom face of the pack main body and a corner portion formed by a back face, the top face and the bottom face. In this case, the pack main body has a bevel of the corner portion formed by the back face, the top face and the bottom face made smaller than a bevel of the corner portion formed by the front face, the top face and the bottom face of the pack main body, thereby making it easier for a lock member to engage.

Furthermore, concave portions stretching between the opposite side faces and the bottom face are formed on the front face of the pack main body. For example, the concave portions are provided on the battery pack, and the concave portions are not provided on a DC plate to be housed in the same battery housing. This can prevent the DC plate to be installed in a battery installation portion of a charger on which position determining protrusions for engaging with the concave portions of the battery pack are formed.

Advantageous Effects of Invention

According to the present invention, since bevelled portions are provided at corner portions formed by a top face, a bottom face and opposite side faces of a pack main body, overall miniaturization can be realized. Also, since a terminal portion is provided, in a protruding manner, on a front face of the pack main body at a position biased with respect to centre lines in a width direction and a height direction, collision between a connection terminal of a battery housing and the terminal portion can be prevented even at the time of wrong insertion. Furthermore, the pack main body can be miniaturized to the extent that the terminal portion is protruded.

BRIEF DESCRIPTION OF DRAWINGS

FIG. 8 is a diagram for explaining arrangement of the terminal portion of the pack main body, and (A) shows the arrangement of the terminal portion of the present embodiment, and (B) shows a terminal arrangement of a reference example.

DESCRIPTION OF EMBODIMENTS

Hereinafter, a battery pack according to the present embodiment will be described with reference to drawings. Additionally, in the section of Description of Embodiments, an explanation will be given in the following order.
(1) Explanation of Digital Still Camera
(2) Explanation of Battery Pack
　(2-1) Configuration of Pack Main Body
　(2-2) Configuration of Terminal Portion
　(2-3) Distinction from DC Plate (Explanation of Charger)
　(2-4) Housing Method of Battery Pack in Digital Still Camera
　(2-5) Effect
(3) Modified Example 1 (DC Plate)
(4) Modified Example 2
(5) Other Modified Examples [0016]

(1) EXPLANATION OF DIGITAL STILL CAMERA

Figure 1:
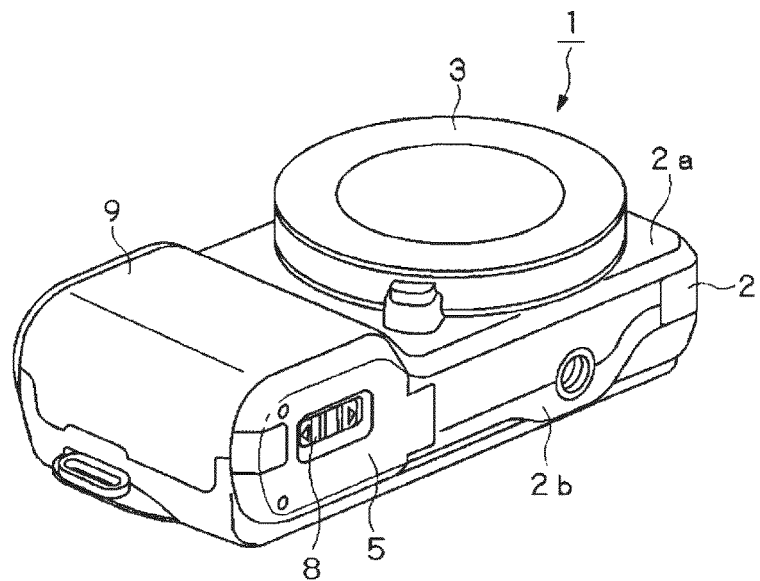
FIG. 1 is a perspective view of a digital still camera.

As shown in FIG. 1, a battery pack 10 according to the present embodiment is installed in a digital still camera 1, which is an electronic appliance. This digital still camera 1 has a camera body 2 which is substantially rectangular, and is provided, on a front face 2a, with a lens portion 3 in which a group of a plurality of lenses such as a zoom lens, a condenser lens, and the like, is embedded. Also, although not shown, a release button which is pressed at the time of imaging a subject is provided to the camera body 2 on one corner portion on the top face, and, furthermore, a light-emitting portion for flash photography is provided on the top face side of the front face 2a of the camera body 2.

One of the sides along the longitudinal direction of the camera body 2 is bulgingly formed so as to be thicker than other areas, and is made a grip portion 9. Also, a battery housing 6 is provided inside this grip portion 9.

Figure 2:
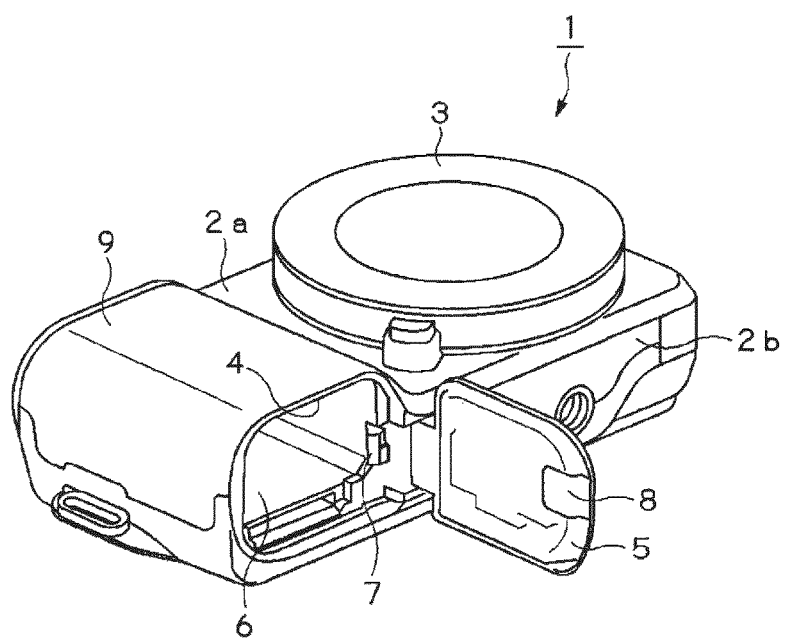
FIG. 2 is a semi-schematic perspective view showing a battery housing of the digital still camera.

As shown in FIG. 2, on a lower face 2b of the camera body 2, a battery insertion opening 4 for housing the battery pack 10, which is substantially rectangular and substantially the same size and substantially the same shape as the front face of the battery pack 10, is provided, and, furthermore, a battery lid 5 for opening or closing this battery insertion opening 4 is provided. The battery housing 6 is provided in the camera body 2 continuously from the battery insertion opening 4. A lock member 7 for holding the battery pack 10 installed in the battery housing 6 in the holding position is provided to the battery insertion opening 4. The lock member 7 engages, at the time the battery pack 10 is installed in the battery housing 6, with a corner portion on the back side of the battery pack 10 which is urged by a spring pressure of a connection terminal or an ejection spring in an ejection direction, and prevents falling off from the battery housing 6.

Specifically, this lock member 7 is fixed near the battery insertion opening 4 in a freely rotating manner. Then, with a tip portion of the lock member 7 facing the battery insertion opening 4 by a rotating operation, a lock claw engages with the corner portion on the back face of the battery pack 10 installed in the battery housing 6. The lock member 7 thus prevents the battery pack 10 from jumping out the battery insertion opening 4 by the spring pressure of the connection terminal or the spring pressure of the ejection spring out the battery housing 6.

Furthermore, the battery lid 5 is fitted near the battery insertion opening 4 in a rotatable manner so as to open or close the battery insertion opening 4. A lid lock portion 8 is provided to this battery lid 5 at a tip side. The lid lock portion 8 is provided to the battery lid 5 in a slidable manner. The lid lock portion 8 engages with a concave lock portion formed at an open end of the battery insertion opening 4 by the battery lid 5 being slid in a direction of a lock protruding from the tip portion of the battery lid 5 while blocking the battery insertion opening 4. The battery lid 5 thus locks the battery insertion opening 4 in a blocked state. Furthermore, the battery lid 5 releases the engaged state of the lid lock portion 8 and the concave lock portion by sliding the lid lock portion 8 in a lock releasing direction of going into the battery lid 5. The battery lid 5 is thus made rotatable and can open the battery insertion opening 4.

Additionally, to remove the battery pack 10 from the battery housing 6, this lock member 7 is rotated and moved away from above the battery insertion opening 4, and the engaged state of the back face side corner portion of the battery pack 10 and the lock member 7 is released. The battery pack 10 thus protrudes, as if on its own, from the battery insertion opening 4 by the spring pressure of the connection terminal or the spring pressure of the ejection spring, and is ejected.

(2) EXPLANATION OF BATTERY PACK

A lithium-ion secondary battery is used as the battery pack 10 that is inserted from this battery insertion opening 4 and installed in the battery housing 6 and that supplies power to the camera body 2, for example.

(2-1) Configuration of Pack Main Body

Figure 3:
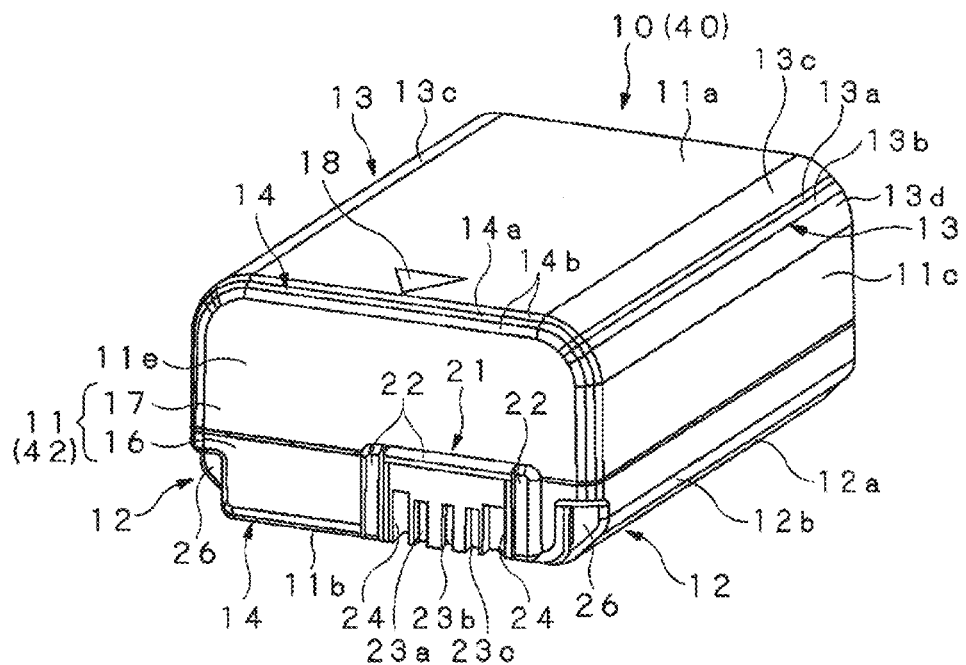
FIG. 3 is a perspective view of a battery pack seen from the front side.
Figure 4:
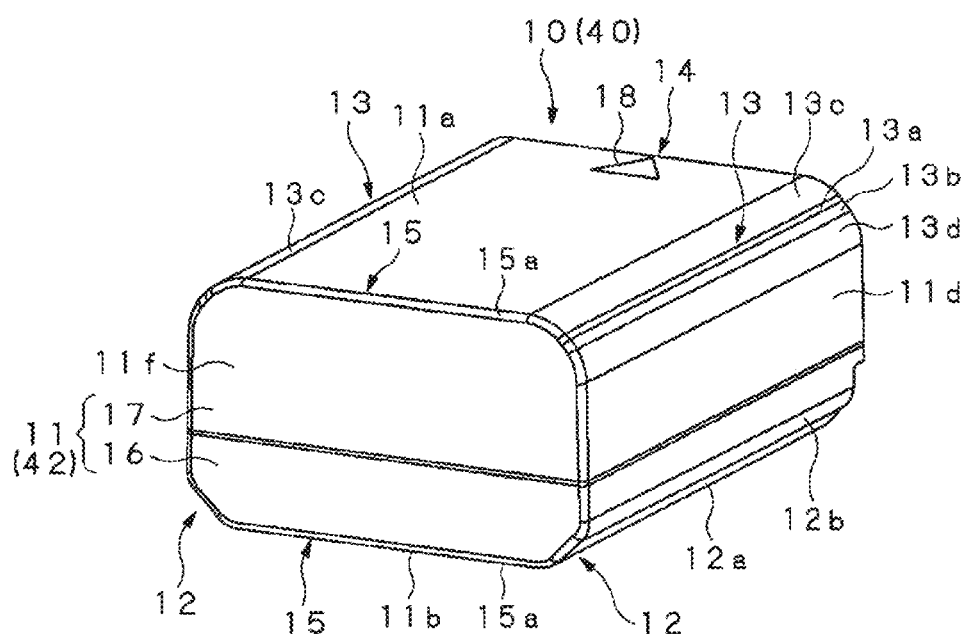
FIG. 4 is a perspective view of the battery pack seen from the back side.

As shown in FIGS. 3 and 4, this battery pack 10 has a pack main body 11 in which a battery cell 10a of a lithium-ion secondary battery is embedded. This pack main body 11 has its whole body formed into a substantially rectangular parallelepiped shape, and is formed such that six surfaces are substantially plane. As shown in FIGS. 3 to 6, a front face 11e of this pack main body 11 is a terminal face, and a terminal portion 21 is formed.

Figure 5:
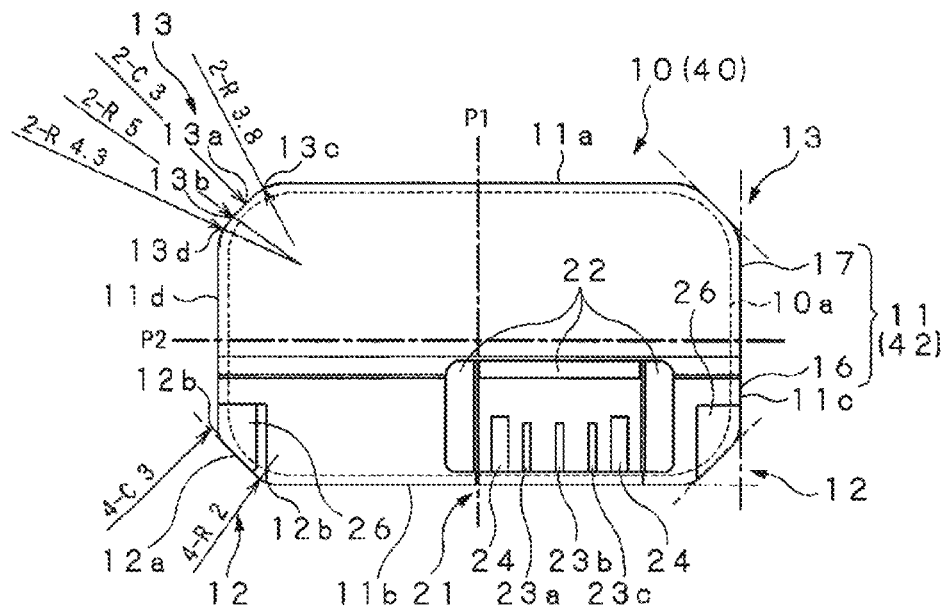
FIG. 5 is a front view of the battery pack.
Figure 6:
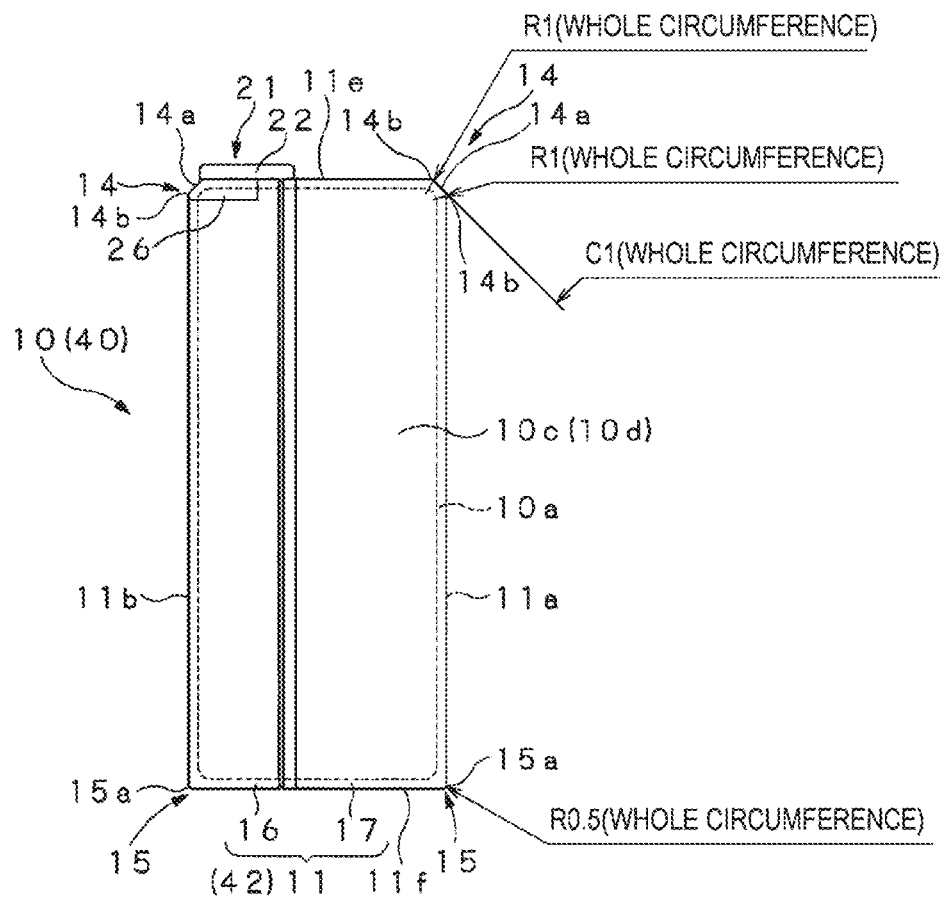
FIG. 6 is a side view of the battery pack.

Bevelled portions are formed at all of first and second corner portions formed by a top face 11a and a bottom face 11b and opposite side faces 11c and 11d of the pack main body 11. As shown in FIG. 5, the bevelled portions of the first corner portions 12, 12 formed by the bottom face 11b and the opposite side faces 11c and 11d of the pack main body 11 are both chamfered surfaces 12a, and, here, the angle of the bevels is 45 degrees and the measurement of the bevels is 3 mm. Also, both sides of the chamfered surface 12a are rounded surfaces 12b, 12b, and, here, the radius is 2 mm.

Additionally, the measurements of the chamfered surface 12a and the rounded surface 12b are not limited to these.

Furthermore, as shown in FIG. 5, the bevelled portions of second corner portions 13, 13 formed by the top face 11a and the opposite side faces 11c and 11d of the pack main body 11 are both substantially rounded surfaces. Specifically, the second corner portions 13, 13 are substantially rounded surfaces 13a that internally touch chamfered surfaces the same as the chamfered surfaces 12a of the bevelled portions of the first corner portions 12, 12 of the pack main body 11. Specifically, the second corner portions 13, 13 have a shape where a chamfered surface 13a and a first rounded surface 13b are made continuous in the middle, and, here, the chamfered surface 13a has the angle of the bevel of 45 degrees and the measurement of the bevel of 3 mm and the first rounded surface 13b has the radius of 5 mm. The chamfered surfaces 13a of the second corner portions 13, 13 are bevelled in the same way as the chamfered surfaces 12a of the first corner portions 12. Furthermore, the top face 11a side of the chamfered surface 13a turns into a second rounded surface 13c so as to be continuous with the top face 11a, and, here, the radius is 3.8 mm. Also, the bottom face 11b side of the first rounded surface 13b turns into a third rounded surface 13d so as to be continuous with the bottom face 11b, and, here, the radius is 4.3 mm.

Additionally, the measurements of the chamfered surface 13a and the first to third rounded surfaces 13b to 13d are not limited to these. Also, the chamfered surface 13a portion may be omitted at the second corner portion 13, and this omitted portion may be made into the first rounded surface 13b that internally touches the chamfered surface the same as the chamfered surfaces 12a of the bevelled portions of the first corner portions 12, 12.

As described above, the pack main body 11 realizes overall miniaturization by forming bevelled portions at the first and second corner portions 12, 13 formed by the top face 11a and the bottom face 11b and the opposite side faces 11c and 11d. Also, according to the pack main body 11, the bevelled portions of the first corner portions 12, 12 on the bottom face 11b side of the pack main body 11 and of the second corner portions 13, 13 of the top face 11a side of the pack main body are differently shaped. The pack main body 11 thus allows, when touched by a hand, a user to distinguish between the upper and lower faces of the pack main body 11, thereby preventing wrong insertion into the battery housing 6.

Additionally, the shape of the first corner portion 12 and the shape of the second corner portion 13 described above may be exchanged, and the shape of the first corner portion 12 may be made the shape of the second corner portion 13 and the shape of the second corner portion 13 may be made the first shape.

A front face side corner portion 14 formed by the front face 11e, the top face 11a, and the bottom face 11b of the pack main body 11 and a back face side corner portion 15 formed by a back face 11f, the top face 11a, and the bottom face 11b are both bevelled portions. The back face side corner portion 15 formed by the back face 11f, the top face 11a, and the bottom face 11b of the pack main body 11 is a rounded surface 15a with a radius is 0.5 mm around the entire circumference.

Furthermore, the front face side corner portion 14 formed from the front face 11e, the top face 11a, and the bottom face 11b of the pack main body 11 is made into a rounded surface 14b whose radius is 1 mm on both sides of a chamfered surface 14a whose angle of the bevel is 45 degrees and measurement of the bevel is 1 mm.

That is, the pack main body 11 has the bevel of the back face side corner portion 15 made smaller than that of the front face side corner 14. This makes it easy for the lock claw of the lock member 7 on the side of the battery housing 6 of the camera body 2 to engage with the back face side corner portion 15 of the pack main body 11. Additionally, making it easy for the lock claw of the lock member 7 on the side of the battery housing 6 to engage with the back face side corner portion 15 allows to realize miniaturization of the lock member 7 of the battery insertion opening 4. Also, the pack main body 11 realizes overall miniaturization by forming bevelled portions at the front face side corner portion 14 and the back face side corner portion 15.

Additionally, if the bevel of the back face side corner portion 15 is smaller than the bevel of the front face side corner portion 14, the front face side corner portion 14 and the back face side corner portion 15 may be any shape among combinations of chamfered surfaces, rounded surfaces, and a chamfered surface and a rounded surface. Also, the measurements of the front face side corner portion 14 and the back face side corner portion 15 are not limited to the examples above. Furthermore, contrary to the example described above, when the corner portion with which the lock member 7 engages is the front face side corner portion 14, the bevel of the front face side corner portion 14 is made smaller than that of the back face side corner portion 15.

As shown in FIGS. 3 and 4, the pack main body 11 that houses the battery cell 10a is formed by butting and joining, by welding, adhesive or the like, half cases 16, 17 of the pack that are formed by injection-molding synthetic resin. One of the half cases of the pack, 16, is matte finished. The pack main body 11 enables, also by the matte finishing of the half case 16 of the pack, to distinguish between the top and bottom of the pack main body 11 by touching or viewing. Also, an insertion direction display portion 18 is formed, by engraving or printing a triangle mark or the like, on the top face 11a of the pack main body 11 on the side of the front face 11e where the terminal portion is provided.

(2-2) Configuration of Terminal Portion

As shown in FIGS. 3, 5, 6 and 7, the terminal portion 21 is formed on the front face 11e of the pack main body 11. As shown in FIG. 5, this terminal portion 21 is provided on the front face 11e, protruding at a position biased to one side with respect to a centre line P1 in a width direction and a centre line P2 in a height direction. Specifically, the terminal portion 21 is open on the side of the bottom face 11b of the pack main body 11 and surrounded on three sides by upright walls 22, and is provided, within the upright walls 22, with a negative terminal 23a, a control terminal 23b, and a positive terminal 23c in this order from the centre line P1 in the width direction. These terminals 23a to 23c are formed so as to cause connection springs to face out from within slits in a height direction and to protect the connection springs. A negative connection terminal, a control connection terminal, and a positive connection terminal at the bottom face of the battery housing 6 enter respective slits of the negative terminal 23a, the control terminal 23b, and the positive terminal 23c, and are electrically connected with the connection springs within the respective slits.

Guide grooves 24, 24 are formed on the outer sides of the negative terminal 23a and the positive terminal 23c. The guide grooves 24, 24 are formed to be wider than the slit of each of the terminal portions 23a to 23c. When housed in the battery housing 6, guide protrusions at the bottom face of the battery housing 6 or at a charging terminal portion of a charger engage with the guide grooves 24, 24, and protect a part where each terminal is electrically connected.

Additionally, the number of terminals of the terminal portion 21 is not limited to such, and it may be more than four, with a reserved terminal or terminals for other usages provided. Also, a negative terminal and a positive terminal only will also suffice.

Here, FIG. 7(A) shows a battery pack 100 shown as a reference example, and FIG. 7(B) shows the battery pack 10 according to the present embodiment. In the reference example of FIG. 7(A), the terminal face of a pack main body 101 is flat. Accordingly, a space of a depth D1 for providing a terminal portion 111 for receiving a connection terminal 6b that is provided being protruded from the bottom face of the battery housing 6 becomes necessary within the pack main body 101. Thus, both sides of the terminal portion 111 tend to be empty spaces 112.

Figure 7:
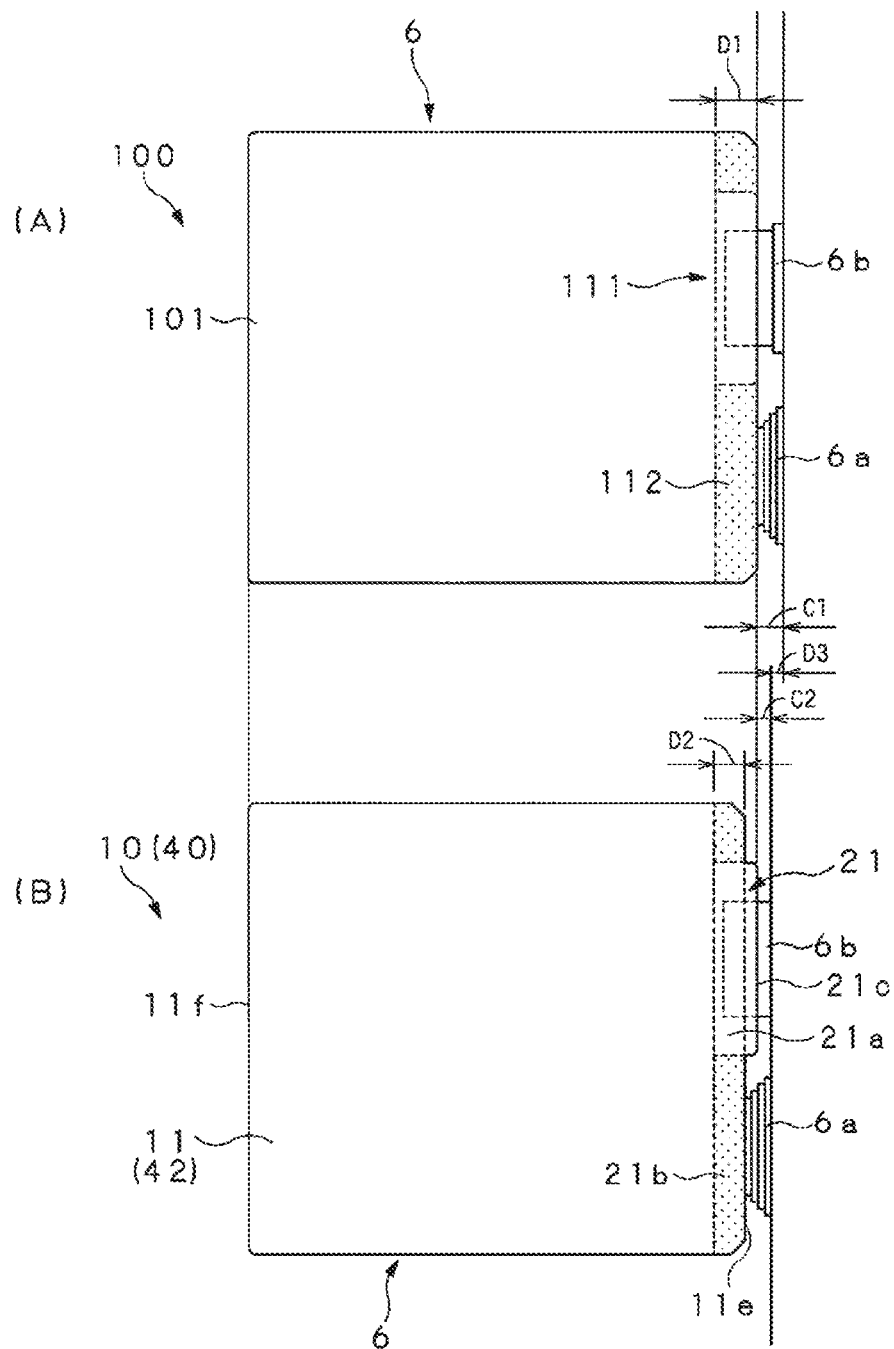
FIG. 7 is a diagram for explaining a terminal portion of a pack main body, and (A) shows a reference example where the terminal portion and the front side of the pack main body are flat, and (B) shows a pack main body whose terminal portion protrudes from the front side of the pack main body.

On the other hand, as shown in FIG. 7(B), with the pack main body 11 of the present embodiment, a space 21a, within the pack main body 11, that is drawn into the front face 11e and that is to be provided with the terminal portion 21 can be made shallow to the extent that the terminal portion 21 is protruded and can be made to be of a depth D2. That is, the pack main body 11 is miniaturized to the extent that the terminal portion 21 is protruded (D3). This enables the pack main body 11 to reduce the empty spaces 21b on both sides of the terminal portion 21, and miniaturization to that extent can be realized. Also, a tip surface 21c of the terminal portion 21 can be brought further closer to the bottom face of the battery housing 6 of the camera body 2 (C1>C2 in FIG. 7).

Furthermore, arrangement of the terminal portion 21 will be described with reference to FIG. 8. FIG. 8(A) shows the battery pack 10 according to the present embodiment. The lower half of FIG. 8(A) shown by solid lines shows the lower half below the centre line P2 in the height direction of FIG. 5, and the upper half shown by dotted lines shows a state where the lower half is rotated 180 degrees to be symmetric with respect to a point. Also, FIG. 8(B) shows a reference example, and a terminal portion 121 is provided in the centre portion in the width direction at a position biased to one side in the thickness direction. The lower half of FIG. 8(B) shown by solid lines shows the lower half below the centre line P2 in the height direction of FIG. 5, and the upper half shown by dotted lines is a diagram showing a state where the lower half is rotated 180 degrees to be symmetric with respect to a point. In FIGS. 8(A) and 8(B), the positions of the terminal portions 21, 121 in a state where the lower halves are rotated 180 degrees to be symmetric with respect to a point (portions shown by dotted lines) are the positions of the terminal portions 21, 121 when the battery pack 10 is inserted upside down.

The terminal portion 21 at a position biased to one side with respect to the centre lines in the width direction and the thickness direction of the front face 11e in FIG. 8(A) will be at a position that will not interfere with the connection terminal 6b provided protruding from the bottom face of the battery housing 6 even when the terminal portion 21 is at a position that is point symmetric with respect to the normal position. Furthermore, in the example of FIG. 8(A), the area that an ejection spring 6a that is provided on the bottom face of the battery housing 6 of the camera body 2 contacts can be made large on the front face 11e of the pack main body 11. Here, a coil spring with a radius of 5 mm can be used.

On the other hand, in FIG. 8(B) which is a reference example, the terminal portion 121 is provided on the front face 11e of the battery pack 10 in a centre portion in the width direction at a position biased to one side in the thickness direction. When positioned to be point symmetric with respect to the normal position, the terminal portion 121 may interfere with the connection terminal 6b provided protruding from the bottom face of the battery housing 6. Also, in the example of FIG. 8(B), the area that the ejection spring 6a that is provided on the bottom face of the battery housing 6 of the camera body 2 contacts is smaller on the front face 11e of the pack main body 11 compared to FIG. 8(A). Here, only a coil spring of a radius of 4 mm can be used.

Here, as shown in FIG. 8(A), the distance between the control terminal 23b in the middle of the terminal portion 21 in the width direction and the centre of the circular area where the ejection springs touches is 12.3 mm. On the other hand, in the reference example of FIG. 8(B), only 11.35 mm can be reserved for the distance between the control terminal 23b in the middle of the terminal portion 121 in the width direction and the centre of the circular area where the ejection spring 6a touches.

(2-3) Distinction from DC Plate (Explanation of Charger)

As shown in FIGS. 3 and 5, concave portions 26, 26 that stretch between the opposite side faces 11c and 11d and the bottom face 11b are formed on the front face 11e of the pack main body 11. These concave portions 26, 26 will be the concave portions that position determining protrusions of a charger engage with at the time of installation in the charger.

Figure 9:
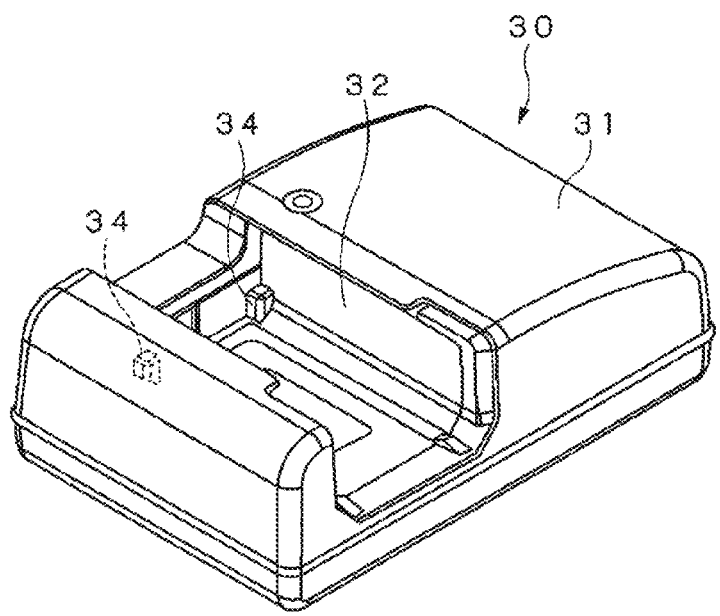
FIG. 9 is a perspective view of a charger.
Figure 10:
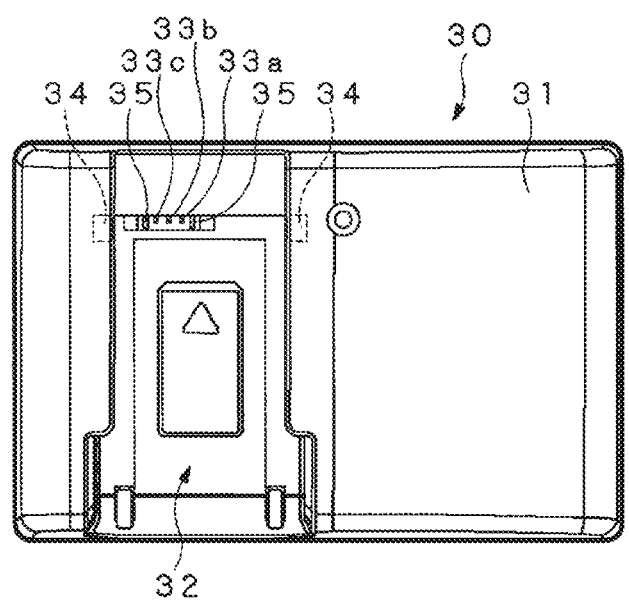
FIG. 10 is a plan view of the charger.

As shown in FIGS. 9 and 10, a charger 30 includes a charging circuit within a device main body 31, and, also, a battery installation portion 32 in which the battery pack 10 is installed is to be formed. This battery installation portion 32 is a concave portion having substantially the same size as the bottom face 11b of the pack main body 11. A negative charging terminal 33a, a control charging terminal 33b, and a positive charging terminal 33c, that form a charging terminal portion 33, are formed in a protruding manner on the battery installation portion 32 at one end portion at which the front face 11e of the pack main body 11 is to be placed. Furthermore, guide protrusions 35, 35 for engaging with the guide grooves 24, 24 are also formed on the battery installation unit 32. Furthermore, position determining protrusions 34, 34 for engaging with the concave portions 26, 26 of the pack main body 11 are formed on both sides of the surfaces where the front face 11e of the pack main body 11 is to be placed.

The battery pack 10 is installed in the battery installation portion 32 with the front face 11e of the pack main body 11 as the insertion end. Then, position determination is performed with the concave portions 26, 26 being engaged with the position determining protrusions 34, 34, and, further, the terminal portion 21 of the battery pack 10 and the charging terminal portion 33 are electrically connected, and charging is started.

Figure 11:
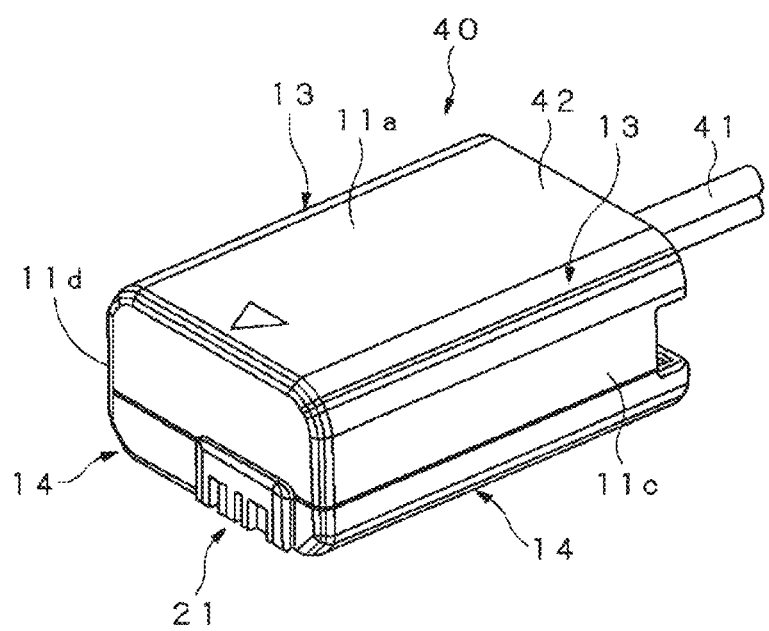
FIG. 11 is a perspective view of a DC plate.

As a device for supplying power to the digital still camera 1, besides the battery pack 10 that is to be housed in the battery housing 6, there is a DC plate 40 as shown in FIG. 11. This DC plate 40 is housed in the battery housing 6 of the digital still camera 1 instead of the battery pack 10, and is connected with an AC adapter that converts household AC power into DC power. Then, the DC plate 40 supplies the DC power to the digital still camera 1 by being housed in the battery housing 6. Since this DC plate 40 is to be housed in the battery housing 6, a plate body 42 is the same size as the battery pack 10, and the shape is the same except for the shape of the back face from where a cord 41 is drawn out.

Additionally, with respect to the DC plate 40, portions the same as those of the battery pack 10 are denoted with the same reference signs, and details are omitted.

This DC plate 40 is the same shape on the insertion side to the battery housing 6 as the battery pack 10. Thus, there is a possibility that the DC plate 40 is wrongly installed in the battery installation portion 32 of the charger 30. Accordingly, the concave portions 26, 26 that stretch between the opposite side faces 11c and 11d and the bottom face 11b are not formed on the front face side of the DC plate 40.

Now, a case where the battery pack 10 is installed in the battery installation portion 32 of the charger 30 will be described with reference to FIG. 12. As shown in FIG. 12(A), the concave portions 26, 26 that stretch between the side faces 11c, 11d and the bottom face 11b are formed on the front face 11e of the pack main body 11 of the battery pack 10. On the other hand, the position determining protrusions 34, 34 for engaging with the concave portions 26, 26 are formed on the battery installation portion 32 of the charger 30. Accordingly, at the time of installation of the battery pack 10 in the battery installation portion 32 of the charger 30, the position determining protrusions 34, 34 of the battery installation portion 32 engage with the concave portions 26, 26. The battery pack 10 is thus installed in the battery installation portion 32 of the charger 30.

Figure 13:
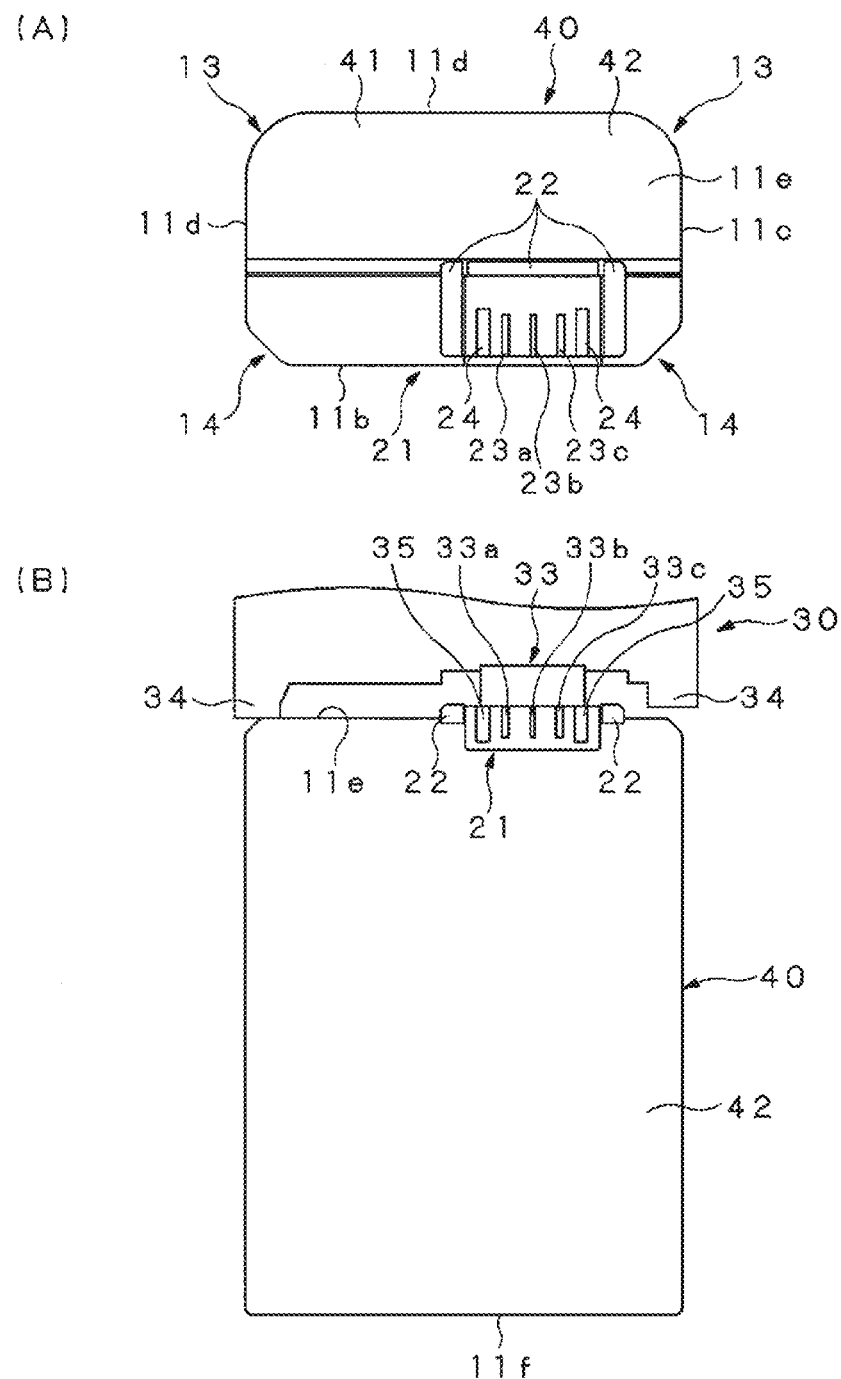
FIG. 13 is a diagram for explaining a state where the DC plate is attached to the charger, and (A) is a front view of the DC plate, and (B) is a plan view showing a state where the DC plate is attached to the charger.

On the other hand, when installing the DC plate 40 in the battery installation portion 32 of the charger 30, it will be as shown in FIG. 13. As described above, unlike the battery pack 10, the concave portions 26, 26 that stretch between the opposite side faces 11c and 11d and the bottom face 11b are not provided on the front face side of the DC plate 40, as shown in FIG. 13(A). Accordingly, as shown in FIG. 13(B), when installing the DC plate 40 in the battery installation portion 32 of the charger 30, the position determining protrusions 34, 34 of the battery installation portion 32 hit against the front face 11. This can prevent the terminal portion 21 of the DC plate 40 and the charging terminal portion 33 of the battery installation portion 32 from mechanically and electrically connecting with each other.

(2-4) Housing Method of Battery Pack in Digital Still Camera

As shown in FIG. 3, the battery pack 10 configured in the above manner has the front face 11e of the pack main body 11 as the insertion end to the battery insertion opening 4 continuous to the battery housing 6 of the camera body 2. The insertion direction into the battery insertion opening 4 or the up and down of the battery pack 10 can be distinguished by the configuration of the pack main body 11 as below in addition to the insertion direction display portion 18 formed on the top face 11a of the pack main body 11.

That is, the pack main body 11 has the shapes of the bevelled portions of the first corner portions 12, 12 on the bottom face 11b side and the second corner portions 13, 13 on the top face 11a side made different from each other. The pack main body 11 thus allows, when touched by a hand, a user to distinguish between the upper and lower faces of the pack main body 11, thereby preventing wrong insertion into the battery housing 6.

Furthermore, the pack main body 11 has one of the half cases of the pack, 16, matte finished, allowing it to be distinguished from the other half case of the pack, 17, thereby preventing wrong insertion into the battery housing 6.

Furthermore, the insertion direction of the battery pack 10 can be distinguished owing to that the bevel of the back face side corner portion 15 is made smaller than that of the front face side corner portion 14 of the pack main body 11.

As described above, the battery pack 10 allows the orientation at the time of being housed in the battery housing 6 to be distinguished by viewing or touching, thereby preventing wrong insertion.

Then, when the battery pack 10 is housed in the battery housing 6, the negative connection terminal, the control connection terminal, and the positive connection terminal at the bottom face of the battery housing 6 enter respective slits of the negative terminal 23a, the control terminal 23b, and the positive terminal 23c. Then, the negative connection terminal, the control connection terminal, and the positive connection terminal of the battery housing 6 are electrically connected with the connection springs within the respective slits.

Additionally, the position determining protrusions 34, 34 for engaging with the concave portions 26, 26 on the front face 11e of the pack main body 11 are not provided on the bottom face of the battery housing 6 of the digital still camera 1. This is to enable housing, in the battery housing 6, of the DC plate 40 not provided with the concave portions 26, 26 on the front face 11e.

Furthermore, the second corner portions 13, 13 on the top face 11a side of the pack main body 11 are substantially rounded surfaces that internally touch chamfered surfaces the same as the chamfered surfaces 12a of the bevelled portions of the first corner portions 12, 12 on the bottom face 11b side of the pack main body 11. Accordingly, the battery pack 10 can be housed in the battery housing 6 even when it is housed in the battery housing 6 upside down. Also, the pack main body 11 can prevent the inner wall of the battery housing 6 or the like from breaking due to forcible insertion of the battery pack 10. Furthermore, the terminal portion 21 is at a position biased to one side with respect to the centre lines in the width direction and the thickness direction of the front face 11e, and, thus, does not interfere with the connection terminal 6b provided protruding from the bottom face of the battery housing 6. This can prevent the terminal portion 21 and the connection terminal 6b from breaking due to interference or collision with each other even when the battery pack 10 is wrongly inserted.

When the battery pack 10 is housed in the battery housing 6, the lock claw of the lock member 7 engages with the back face side corner portion 15 of the pack main body 11 by the lock member 7 fitted near the battery insertion opening 4 in a rotatable manner being rotated. This prevents the battery pack 10 from jumping out the battery insertion opening 4 by the spring pressure of the connection terminal or the spring pressure of the ejection spring 6a out the battery housing 6. Here, the pack main body 11 has the bevel of the back face side corner portion 15 made smaller than that of the front face side corner portion 14, and has a shape that is easy for the lock claw of the lock member 7 engage with. Accordingly, the pack main body 11 can securely perform locking by the lock member 7.

Then, the battery lid 5 that is fitted near the battery insertion opening 4 in a rotatable manner blocks the battery insertion opening 4 and is locked by the lid lock portion 8. This makes the battery pack 10 securely housed in the battery housing 6 of the digital still camera 1.

Furthermore, to remove the battery pack 10 from the battery housing 6, the locking by the lid lock portion 8 is released, the battery lid 5 is opened, and the locking by the lock member 7 is released. The battery pack 10 thus protrudes, as if on its own, from the battery insertion opening 4 by the spring pressure of the connection terminal or the spring pressure of the ejection spring, and is ejected.

Additionally, a process for housing the battery pack 10 in the battery housing 6 has been described above, but the DC plate 40 shown in FIG. 11 is also housed in the battery housing 6 by an equivalent process.

(2-5) Effect

With the battery pack 10 as described above, overall miniaturization can be realized by forming bevelled portions at the first and second corner portions 12, 13 formed by the top face 11a and the bottom face 11b and the opposite side faces 11c and 11d, as shown in FIGS. 3 to 6. Also, the pack main body 11 has the shapes of the bevelled portions of the first corner portions 12, 12 on the bottom face 11b side of the pack main body 11 and the second corner portions 13, 13 on the top face 11a side of the pack main body 11 made different from each other. The pack main body 11 thus allows, when touched by a hand, a user to distinguish between the upper and lower faces of the pack main body 11, thereby preventing wrong insertion into the battery housing 6.

Also, the pack main body 11 has the bevel of the back face side corner portion 15 made smaller than that of the front face side corner portion 14. This makes it easy, with respect to the pack main body 11, to engage the lock claw of the lock member 7 of the battery housing 6 of the camera body 2 with the back face side corner portion 15. Additionally, miniaturization of the lock member 7 of the battery insertion opening 4 can be realized by making it easy for the lock claw of the lock member 7 of the battery housing 6 to engage with the back face side corner portion 15. Furthermore, the pack main body 11 can realize overall miniaturization by forming bevelled portions at the front face side corner portion 14 and the back face side corner portion 15.

Furthermore, as shown in FIG. 7(B), with the pack main body 11 of the present embodiment, a space 21a, within the pack main body 11, that is drawn into the front face 11e and that is to be provided with the terminal portion 21 can be made shallow to the extent that the terminal portion 21 is protruded and can be made to be of a depth D2. That is, the pack main body 11 can be miniaturized to the extent that the terminal portion 21 is protruded (D3). This enables the pack main body 11 to reduce the empty spaces 21b on both sides of the terminal portion 21, and miniaturization to that extent can be realized. Also, a tip surface 21c of the terminal portion 21 can be brought further closer to the bottom face of the battery housing 6 of the camera body 2 (C1>C2 in FIG. 7).

The terminal portion 21 at a position biased to one side with respect to the centre lines in the width direction and the thickness direction of the front face 11e in FIG. 8(A) will be at a position that will not interfere with the connection terminal 6b provided protruding from the bottom face of the battery housing 6 even when the terminal portion 21 is at a position that is point symmetric with respect to the normal position. Accordingly, even when the battery pack 10 is inserted upside down, interference with the connection terminal 6b provided protruding from the bottom face of the battery housing 6 can be prevented. Furthermore, in the example of FIG. 8(A), the area that an ejection spring 6a that is provided on the bottom face of the battery housing 6 of the camera body 2 contacts can be made large on the front face 11e of the pack main body 11.

Figure 12:
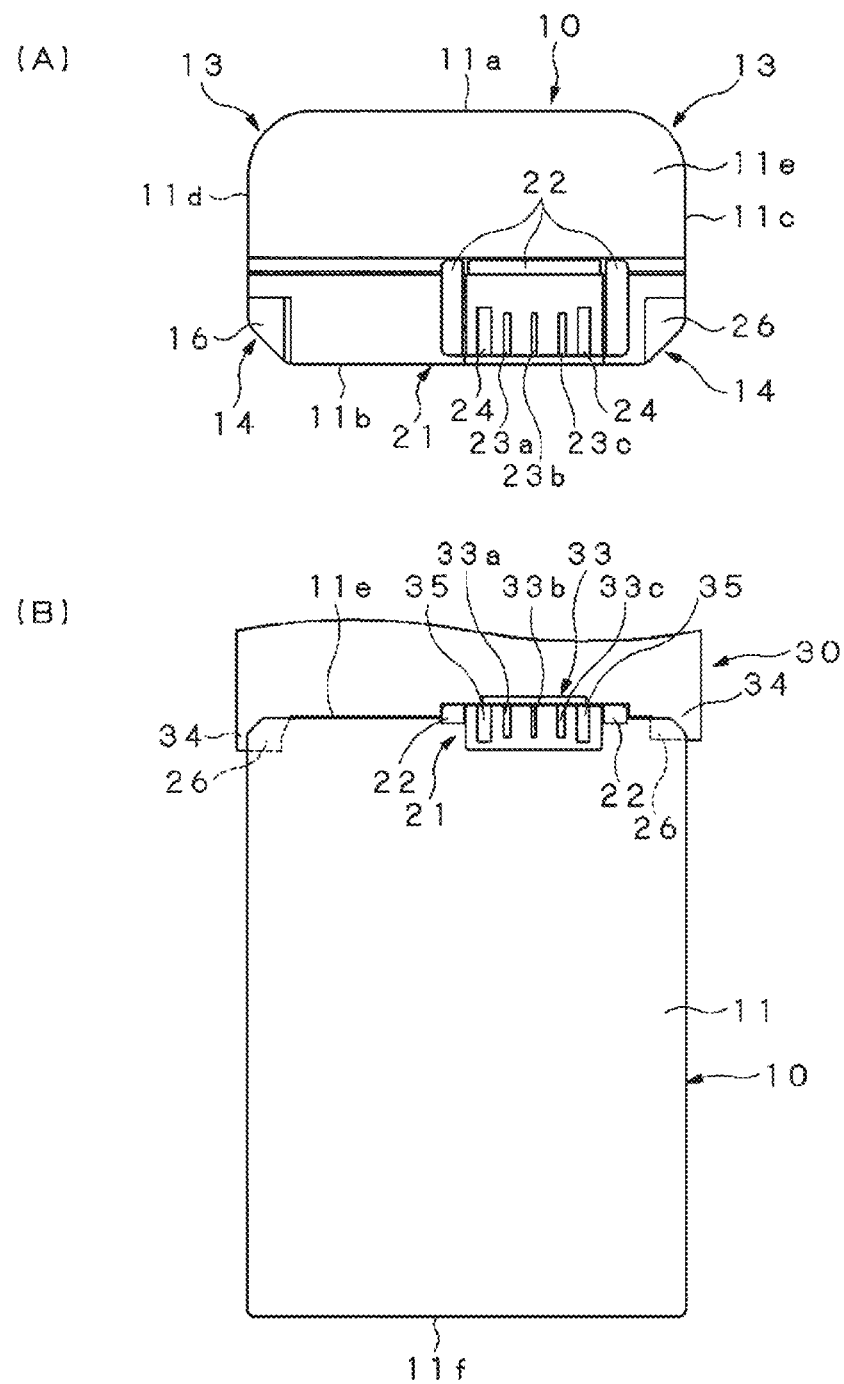
FIG. 12 is a diagram for explaining a state where the battery pack is attached to the charger, and (A) is a front view of the battery pack, and (B) is a plan view showing a state where the battery pack is attached to the charger.

Furthermore, as shown in FIGS. 12 and 13, the concave portions 26, 26 are provided on the front face 11e of the pack main body 11 with respect to the battery pack 10, but the concave portions 26, 26 are not provided on the front face 11e of the plate body 42 with respect to the DC plate 40. For its part, the position determining protrusions 34, 34 are provided to the battery installation portion 32 of the charger 30. Accordingly, only the battery pack 10 having the concave portions 26, 26 can be installed in the battery installation portion 32 of the charger 30, and wrong insertion of the DC plate 40 into the battery installation portion 32 can be prevented.

(3) MODIFIED EXAMPLE 1

DC Plate

Application is also possible to the DC plate 40 as described above, in addition to the battery pack 10 as described above. As shown in FIG. 11, the DC plate 40 is housed in the battery housing 6 of the digital still camera 1 instead of the battery pack 10, and is connected with an AC adapter that converts household AC power into DC power. The DC plate 40 supplies the DC power to the digital still camera 1 by being housed in the battery housing 6. Since this DC plate 40 is to be housed in the battery housing 6, the plate body 42 is the same size as the battery pack 10, and the shape is the same except for the shape of the back face from where the cord 41 is drawn out.

That is, realization of overall miniaturization is aimed at, also with respect to the DC plate 40, by forming bevelled portions at first and second corner portions 12, 13 formed by a top face 11a, a bottom face 11b and opposite side faces 11c and 11d of the plate body 42. Also, the plate body 42 has the bevelled portions at the first corner portions 12, 12 on the bottom face 11b side and the second corner portions 13, 13 on the top face 11a side made into different shapes. The plate body 42 thereby allows, when touch by a hand, a user to distinguish between the upper and lower surfaces of the plate body 42, and, thereby, wrong insertion into the battery housing 6 can be prevented (see FIGS. 3 to 6).

That is, the plate body 42 has the bevel of a back face side corner portion 15 made smaller than that of a front face side corner 14. This makes it easy for the lock claw of the lock member 7 on the side of the battery housing 6 of the camera body 2 to engage with the back face side corner portion 15 of the plate body 42. Additionally, making it easy for the lock claw of the lock member 7 on the side of the battery housing 6 to engage with the back face side corner portion 15 allows to realize miniaturization of the lock member 7 of the battery insertion opening 4. Also, the plate body 42 can realize overall miniaturization by forming bevelled portions at the front face side corner portion 14 and the back face side corner portion 15 (see FIGS. 3 to 6).

Furthermore, with the plate body 42, a space 21a, within the plate body 42, that is drawn into a front face 11e and that is to be provided with a terminal portion 21 can be made shallow to the extent that the terminal portion 21 is protruded and can be made to be of a depth D2. That is, the plate body 42 can be miniaturized to the extent that the terminal portion 21 is protruded (D3). This enables the plate body 42 to reduce the empty spaces 21b on both sides of the terminal portion 21, and miniaturization to that extent can be realized. Also, a tip surface 21c of the terminal portion 21 can be brought further closer to the bottom face of the battery housing 6 of the camera body 2 (C1>C2 in FIG. 7) (see FIG. 7).

The terminal portion 21 at a position biased to one side with respect to the centre lines in the width direction and the thickness direction of the front face 11e in FIG. 8(A) will be at a position that will not interfere with the connection terminal 6b provided protruding from the bottom face of the battery housing 6 even when the terminal portion 21 is at a position that is point symmetric with respect to the normal position. Accordingly, even when the DC plate 40 is inserted upside down, interference with the connection terminal 6b provided protruding from the bottom face of the battery housing 6 can be prevented (see FIG. 8). Furthermore, in the example of FIG. 8(A), the area that an ejection spring 6a that is provided on the bottom face of the battery housing 6 of the camera body 2 contacts can be made large on the front face 11e of the plate body 42.

(4) MODIFIED EXAMPLE 2

Additionally, with the battery pack 10, the bevelled portions of the first and second corner portions 12, 13 formed by the top face 11a, the bottom face 11b, and the opposite side faces 11c and 11d of the pack main body 11 may have the following shapes.

Figure 14:
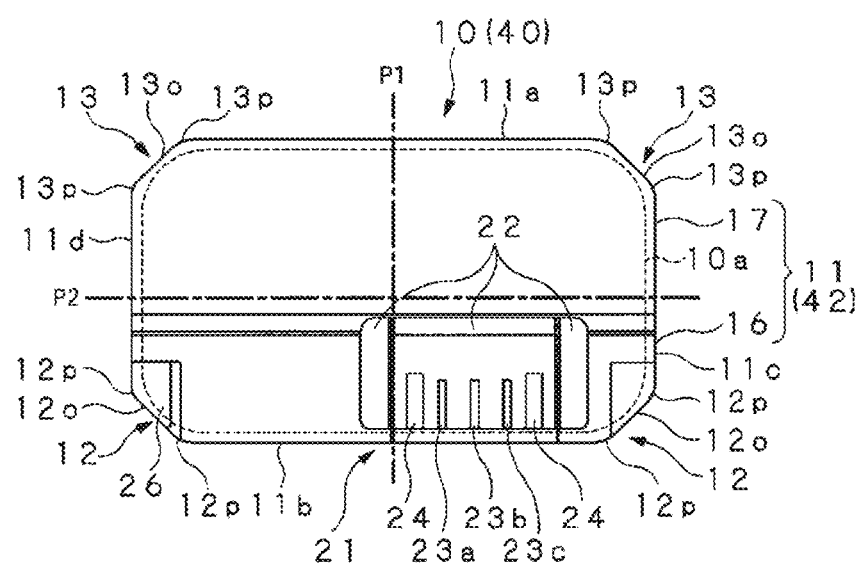
FIG. 14 is a front view of a modified example of the battery pack.

FIG. 14 has the bevelled portions at the first and second corner portions all made into a chamfered shape. For example, as shown in FIG. 14, the first and second corner portions 12, 13 all have rounded surfaces 12p, 13p formed on both sides of chamfered surfaces 12o, 13o.

Figure 15:
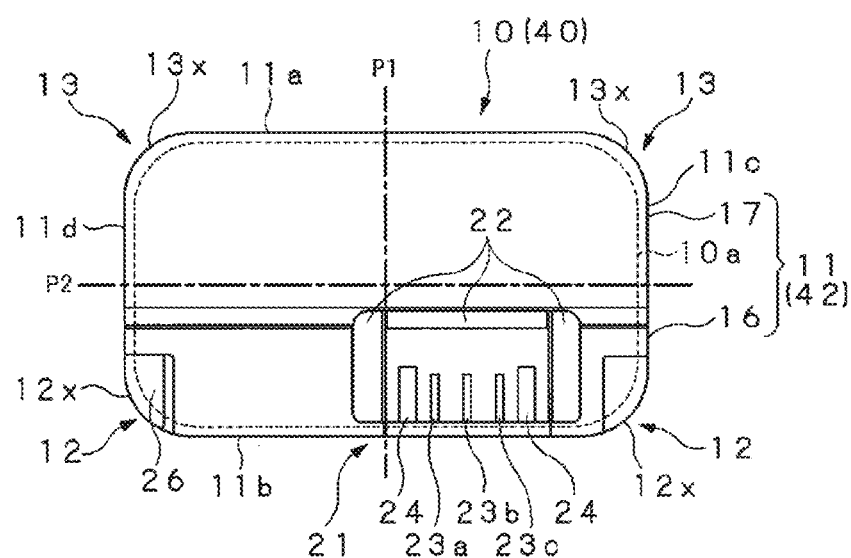
FIG. 15 is a front view of a modified example of the battery pack.

Also, FIG. 15 has the bevelled portions at the first and second corner portions all made into a rounded shape. For example, as shown in FIG. 15, the first and second corner portions 12, 13 all have rounded surfaces 12x, 13x.

(5) OTHER MODIFIED EXAMPLES

In the foregoing, an explanation has been given taking, as an example, the digital still camera 1 for which the battery pack 10 or the DC plate 40 is used, but as an electronic appliance for which the battery pack 10 or the DC plate 40 is used, there are also the following. For example, the electronic appliance may be an imaging appliance such as a digital video camera. Furthermore, as other electronic appliances, there may be a PDA (Personal Digital Assistant (Personal Data Assistance), a mobile phone, a laptop computer, and the like. Also, the battery cell is not limited to the lithium-ion secondary battery, and it may also be a nickel-metal hydride secondary battery or the like.

REFERENCE SIGNS LIST

1 Digital still camera
2 Camera body
6 Battery housing
6a Ejection spring
6b Connection terminal
7 Lock member
8 Lid lock portion
9 Grip portion
10 Battery pack
10a Battery cell
11 Pack main body
11a Top face
11b Bottom face
11c, 11d Side faces
11e Front face
11f Back face
12 First corner portion
12a Chamfered surface
12b Rounded surface
12o Chamfered surface
12p Rounded surface
12x Rounded surface
13 Second corner portion
13a Chamfered surface
13b First rounded surface
13c Second rounded surface
13d Third rounded surface
13o Chamfered surface
13p Rounded surface
13x Rounded surface
14 Front face side corner portion
14a Chamfered surface
14b Rounded surface
15 Back face side corner portion
15a Rounded surface
16, 17 Half cases of pack
18 Insertion direction display portion
21 Terminal portion
21a Space
21b Empty space
21c Tip surface
Upright wall
23a Negative terminal
23b Control terminal
23c Positive terminal
24 Guide groove
26 Concave portion
30 Charger
31 Device main body
32 Battery installation portion
33 Charging terminal portion
33a Negative charging terminal
33b Control charging terminal
33c Positive charging terminal
34 Position determining protrusion
35 Guide protrusion
40 DC plate
41 Cord
42 Plate body
100 Battery pack
101 Pack main body
111 Terminal portion
112 Empty space
121 Terminal portion

What is claimed is:
1. A battery having a height, a width, a length, top and bottom surfaces substantially perpendicular to a height direction, first and second side surfaces disposed between said top and bottom surfaces, and front and rear end surfaces disposed between said top and bottom surfaces and also disposed between said first and second side surfaces, said battery comprising:
a terminal area provided at a junction of the front end surface and the bottom surface and having a first surface raised from the front end surface in a length direction of the battery and a second surface offset from the bottom surface in a direction of the top surface in the height direction, the terminal area being disposed at a position biased to one side with respect to a first center line extending in a width direction and centered in the height direction on the front end surface and the terminal area being further biased to one side with respect to a second center line extending in the height direction and centered in the width direction on the front end surface, the terminal area having a plurality of inside slits and a plurality of outside slits located at opposite ends of the inside slits in the width direction;
a first concave portion stretching between the first side surface and the bottom surface and formed on the front end surface; and
a second concave portion stretching between the second side surface and the bottom surface and formed on the front end surface,
wherein:
each of the first concave portion and the second concave portion comprises a first concave side surface that is offset from the bottom surface by a first distance along the height direction and that extends in the length direction and the width direction of the battery;
each outside slit of the plurality of outside slits extends to an end position that is a second distance from the bottom surface of the battery;
the first distance is greater than the second distance;
the height of the battery is smaller than the width and the length of the battery; and
the width of the battery is smaller the length of the battery.

2. The battery according to claim 1, wherein:
corners formed by the first and second side surfaces and the bottom surface are chamfered;
corners formed by the first and second side surfaces and the top surface are rounded; and
the first and second concave portions are opened to the chamfered corners.

3. The battery according to claim 1, further comprising:
a first beveled portion formed at a corner portion formed by the front end surface, the top surface and the bottom surface; and
a second beveled portion formed at a corner portion formed by a rear end surface, the top surface and the bottom surface,
wherein the second beveled portion is smaller than the first beveled portion.

4. The battery according to claim 1, further comprising:
first beveled portions at corner portions formed by the first and second side surfaces and the bottom surface; and
second beveled portions at corner portions formed by the first and second side surfaces and the top surface,
wherein the first beveled portions and the second beveled portions are differently shaped.

5. The battery according to claim 1, further comprising:
a battery case formed by half cases,
wherein:
the half cases are configured to meet parallel to the top surface and the bottom surface; and
one of the half cases is matte finished.

6. The battery according to claim 1, further comprising:
a battery case formed by half cases,
wherein:
the half cases are configured to meet parallel to the top surface and the bottom surface; and
one of the half cases includes the bottom surface and includes the concave portions and the inside and outside slits.

7. The battery according to claim 1, further comprising:
a battery case formed by:
a bottom side case including an entirety of the bottom surface; and
a top side case including an entirety of the top surface,
wherein the first and second concave portions are formed on the bottom side case.

8. The battery according to claim 1, further comprising:
a first base surface formed in a first outside slit, of the plurality of outside slits, parallel to the front and rear end surfaces;
a second base surface in the first concave portion parallel to the front and rear end surfaces; wherein
a position of the second base surface in the first concave portion in the length direction is closer to the front end surface than a position of the first base surface in the length direction.

9. The battery according to claim 1, wherein:
each of the first and second concave portions is of trapezoidal shape and has a short side and a long side viewed from the length direction, wherein said short side and said long side extend in the height direction;
a long side of the first concave portion is closer to the terminal area than a short side of the first concave portion; and
a long side of the second concave portion is closer to the terminal area than a short side of the second concave portion.

10. The battery according to claim 1, wherein:
each of the first and second concave portions has a trapezoidal shape;
each first concave side surface is parallel to the top and bottom surfaces; and
a position of each first concave side surface in the height direction is overlapped with the terminal area in the height direction and is not overlapped with the plurality of outside slits in the height direction.

11. The battery according to claim 1, wherein the first surface of the terminal area is an outermost surface of the battery in the length direction.

12. The battery according to claim 1, wherein the terminal area comprises a terminal portion and upright walls.

13. The battery according to claim 1, wherein the first and second concave portions are for discrimination between the battery and a DC plate connected with an AC adapter that converts AC power into DC power.

14. The battery according to claim 1, further comprising:
an insertion direction display portion formed on the top surface.

15. The battery according to claim 1, wherein the battery is configured to supply power to an imaging apparatus.

16. The battery according to claim 1, wherein the battery is configured to be received in a battery loading portion of an imaging apparatus.

17. An imaging apparatus comprising:
a battery housing; and
a battery comprising:
a height;
a width;
a length;

top and bottom surfaces substantially perpendicular to a height direction of the battery;

first and second side surfaces disposed between said top and bottom surfaces;

front and rear end surfaces disposed between said top and bottom surfaces and also disposed between said first and second side surfaces;

a terminal area provided at a junction of the front end surface and the bottom surface and having a first surface raised from the front end surface in a length direction of the battery and a second surface offset from the bottom surface in a direction of the top surface in the height direction, the terminal area being disposed at a position biased to one side with respect to a first center line extending in a width direction and centered in the height direction on the front end surface and the terminal area being further biased to one side with respect to a second center line extending in the height direction and centered in the width direction on the front end surface of the battery, the terminal area having a plurality of inside slits and a plurality of outside slits located at opposite ends of the inside slits in the width direction;

a first concave portion stretching between the first side surface and the bottom surface and formed on the front end surface;

a second concave portion stretching between the second side surface and the bottom surface and formed on the front end surface, wherein:
each of the first concave portion and the second concave portion comprises a first concave side surface that is offset from the bottom surface by a first distance along the height direction and that extends in the length direction and the width direction of the battery;

each outside slit of the plurality of outside slits extends to an end position that is a second distance from the bottom surface of the battery;

the first distance is greater than the second distance;

the height of the battery is smaller than the width and the length of the battery; and the width of the battery is smaller the length of the battery.

18. The imaging apparatus according to claim 17, wherein the battery housing comprises:
a guide protrusion formed on a bottom face of the battery housing, wherein the guide protrusion is positioned to engage with a first outside slit of the plurality of outside slits when the battery is housed in the battery housing.

19. The imaging apparatus according to claim 17, wherein the battery housing comprises:
first chamfered corner positioned to correspond, when the battery is housed in the battery housing, to second chamfered corners formed at intersections of the first and second side surfaces and the bottom surface of the battery.

20. The battery according to claim 1, wherein the plurality of inside slits comprise a negative terminal, a control terminal, and a positive terminal in this order from the second center line, the outside slits are formed wider in the width direction and larger in the height direction than the inside slits, and the outside slits are configured to engage with guide protrusions at a bottom face of a battery housing of an apparatus when the battery is housed in the battery housing.

21. The battery according to claim 1, wherein the terminal area is separated from the first and second concave portions by the front end surface in the width direction.

22. The battery according to claim 1, wherein a depth of the first concave portion in the length direction closer to the terminal area in the width direction is shallower than a depth of the second concave portion in the length direction further from the terminal area in the width direction.

23. The battery according to claim 22, wherein the depth of the second concave portion in the length direction is larger than a distance in the length direction that the first surface of the terminal area is raised from the front end surface.

24. The imaging apparatus according to claim 17, wherein the plurality of inside slits comprise a negative terminal, a control terminal, and a positive terminal in this order from the second center line, the outside slits are formed wider in the width direction and larger in the height direction than the inside slits, and the outside slits are configured to engage with guide protrusions at a bottom face of the battery housing when the battery is housed in the battery housing.

25. The imaging apparatus according to claim 17, wherein the terminal area is separated from the first and second concave portions by the front end surface in the width direction.

26. The imaging apparatus according to claim 17, wherein a depth of the first concave portion in the length direction closer to the terminal area in the width direction is shallower than a depth of the second concave portion in the length direction further from the terminal area in the width direction.

27. The imaging apparatus according to claim 26, wherein the depth of the second concave portion in the length direction is larger than a distance in the length direction that the first surface of the terminal area is raised from the front end surface.

28. The battery according to claim 20, wherein:
a part of the front end surface located between the terminal area and the second concave portion is configured to contact an ejection spring provided on the bottom face of the battery housing of the apparatus when the battery is housed in the battery housing.

* * * * *